(12) United States Patent
Crovara Pescia

(10) Patent No.: US 6,840,715 B2
(45) Date of Patent: Jan. 11, 2005

(54) CHUTE FOR FORCED IMMERSION OF AN ARTICLE

(76) Inventor: Antonio Crovara Pescia, 71, avenue Monclar, Avignon (FR), 84000

( * ) Notice: Subject to any disclaimer, the term of this patent is extended or adjusted under 35 U.S.C. 154(b) by 0 days.

(21) Appl. No.: 10/275,327

(22) PCT Filed: May 4, 2001

(86) PCT No.: PCT/FR01/01372

§ 371 (c)(1),
(2), (4) Date: May 23, 2003

(87) PCT Pub. No.: WO01/85584

PCT Pub. Date: Nov. 15, 2001

(65) Prior Publication Data

US 2003/0180102 A1 Sep. 25, 2003

(30) Foreign Application Priority Data

May 9, 2000 (FR) .............................................. 00 05884

(51) Int. Cl.⁷ .............................................. B65G 53/52
(52) U.S. Cl. ............................. 406/92; 406/93; 406/198
(58) Field of Search ............................. 406/92, 93, 94, 406/95, 194, 198

(56) References Cited

U.S. PATENT DOCUMENTS

| | | | | |
|---|---|---|---|---|
| 2,778,692 A | * | 1/1957 | Makinson | ..................... 406/93 |
| 2,799,540 A | | 7/1957 | Makinson | |
| 3,643,400 A | | 2/1972 | Barbet | |
| 3,701,565 A | | 10/1972 | Gutterman et al. | |
| 3,822,015 A | * | 7/1974 | Hsieh et al. | ................. 209/173 |
| 4,111,798 A | * | 9/1978 | Peterson et al. | ......... 209/172.5 |
| 5,195,852 A | | 3/1993 | Malugani et al. | |
| 5,242,250 A | * | 9/1993 | Compagnoni | ................. 406/73 |
| 5,645,092 A | * | 7/1997 | Beaumont | ................. 134/102.2 |
| 6,293,407 B1 | * | 9/2001 | Bajema | ...................... 209/495 |
| 6,627,174 B1 | * | 9/2003 | Judat et al. | ................. 423/659 |
| 6,655,878 B1 | * | 12/2003 | de Vos et al. | ................. 406/77 |

* cited by examiner

Primary Examiner—Joe Dillon, Jr.
(74) Attorney, Agent, or Firm—Wenderoth, Lind & Ponack, L.L.P.

(57) ABSTRACT

A sleeve (50) for forced immersion of an article including a tubular body (52) defining an article travel passage, and at least one fluid inlet (58) for establishing an article drive stream. The passage defined by the body is generally tubular. The sleeve has means (58, 60) for establishing a helical stream of liquid inside the passage flowing at the periphery of the passage. The apparatus is applicable to filling a container with fruit.

11 Claims, 8 Drawing Sheets

CHUTE FOR FORCED IMMERSION OF AN ARTICLE

This application is a 371 of PCT/FR/01/01372 filed May 4, 2001.

BACKGROUND OF THE INVENTION

The present invention relates to a sleeve for forced immersion of an article such as a fruit or a vegetable into a basin filled with water, the sleeve comprising a body defining an article travel passage and at least one inlet for a fluid for setting up an article drive stream.

Installations for grading and packaging fruit or vegetables are known. Such an installation comprises a conveyor for transporting fruits individually, each in its own cell. The conveyor passes through a station for evaluating the caliber of each fruit and then passes over a set of temporary storage basins, with each basin being assigned to fruits of a common caliber. Each fruit is ejected from the conveyor into the basin corresponding to its caliber.

Fruits having the same caliber are stored temporarily in a basin and are subsequently conveyed by a collector channel to a container-filling unit. Such containers are formed by rectangular cases having open top faces. The content of such a container is approximately 1 cubic meter ($m^3$) and such containers are sometimes referred to by the name "palox". The walls of such containers are perforated.

In the filling station, the containers are immersed in a basin full of water and the fruits floating on the surface of the basin are immersed inside the container under the action of a flow of water established in the basin.

More precisely, while immersed in the basin of the filling station, the container is covered by a cover having a loading opening. This opening is fitted with a chute for guiding fruits into the inside of the container. The chute generally defines a bend having an open end disposed facing the loading opening in the cover and an opposite end defining a fruit inlet, said inlet extending in a generally vertical plane. The top end of the inlet of the chute is situated above the surface of the water in the basin in which the container is immersed.

In order to ensure that articles are immersed, a very fast flow of water is established between the top portion of the basin and its bottom portion. For this purpose, a pump delivering a flow of about 600 cubic meters per hour ($m^3/h$) has its inlet connected to the vicinity of the bottom of the basin. The outlet from the pump is connected, for example, to the upstream ends of the temporary fruit-storage basins that are provided at the outlet from the conveyor.

The water stream established by the pump circulates from the temporary storage basins to the container-filling basin, flowing along the length of the collector channel. This stream causes fruit to be displaced towards the chute.

The water which is sucked into the bottom of the basin and which circulates through the perforated container sets up stream to drive fruits through the chute.

The fruits entrained in this way by the stream are caused to pass through the chute and through the cover. They are then retained inside the container by the cover.

It will be understood that such an installation for immersing fruits requires a pump to be used that has a very high delivery rate.

SUMMARY OF THE INVENTION

An object of the invention is thus to provide means for forced immersion of an article, which means make it possible to use a pump having a smaller delivery rate.

To this end, the invention provides a sleeve for forced immersion of an article, the sleeve being characterized in that said passage defined by the body is generally tubular and in that the sleeve has means for establishing, in said passage, a helical stream of liquid flowing at the periphery of said passage.

In particular embodiments of the invention, the sleeve comprises one or more of the following characteristics:

said means for establishing the helical stream of liquid comprise at least one injection nozzle forming the liquid inlet and opening out substantially tangentially to the inside of the tubular body, the axis of the injection nozzle at its open end being angularly offset relative to the transverse plane of said passage taken at the open end of the injection nozzle;

the sleeve has at least two nozzles regularly distributed around a circumference of said passage;

the body has a generally tubular outer envelope defining part of said passage, the or each injection nozzle opening out through said envelope, and said means for establishing the helical liquid stream comprise a tubular skirt disposed inside the envelope facing the region into which the or each injection nozzle opens out, which skirt extends over a fraction only of the length of the envelope and defines an article guide duct therein, said skirt co-operating with the envelope to define an annular space in which the helical liquid stream travels, which annular space opens out into said passage at one end; and the sleeve includes a helical guide disposed in said annular space between the outer envelope and the skirt.

The invention also provides equipment for forced immersion of an article, the equipment comprising an immersion sleeve as described above and a pump whose outlet is connected to the or each fluid inlet of the sleeve, which pump has a delivery rate lying in the range 20 $m^3/h$ to 100 $m^3/h$.

BRIEF DESCRIPTION OF THE DRAWINGS

The invention will be better understood on reading the following description given purely by way of example and made with reference to the accompanying drawings, in which.

DETAILED DESCRIPTION OF THE INVENTION

Figure 1:
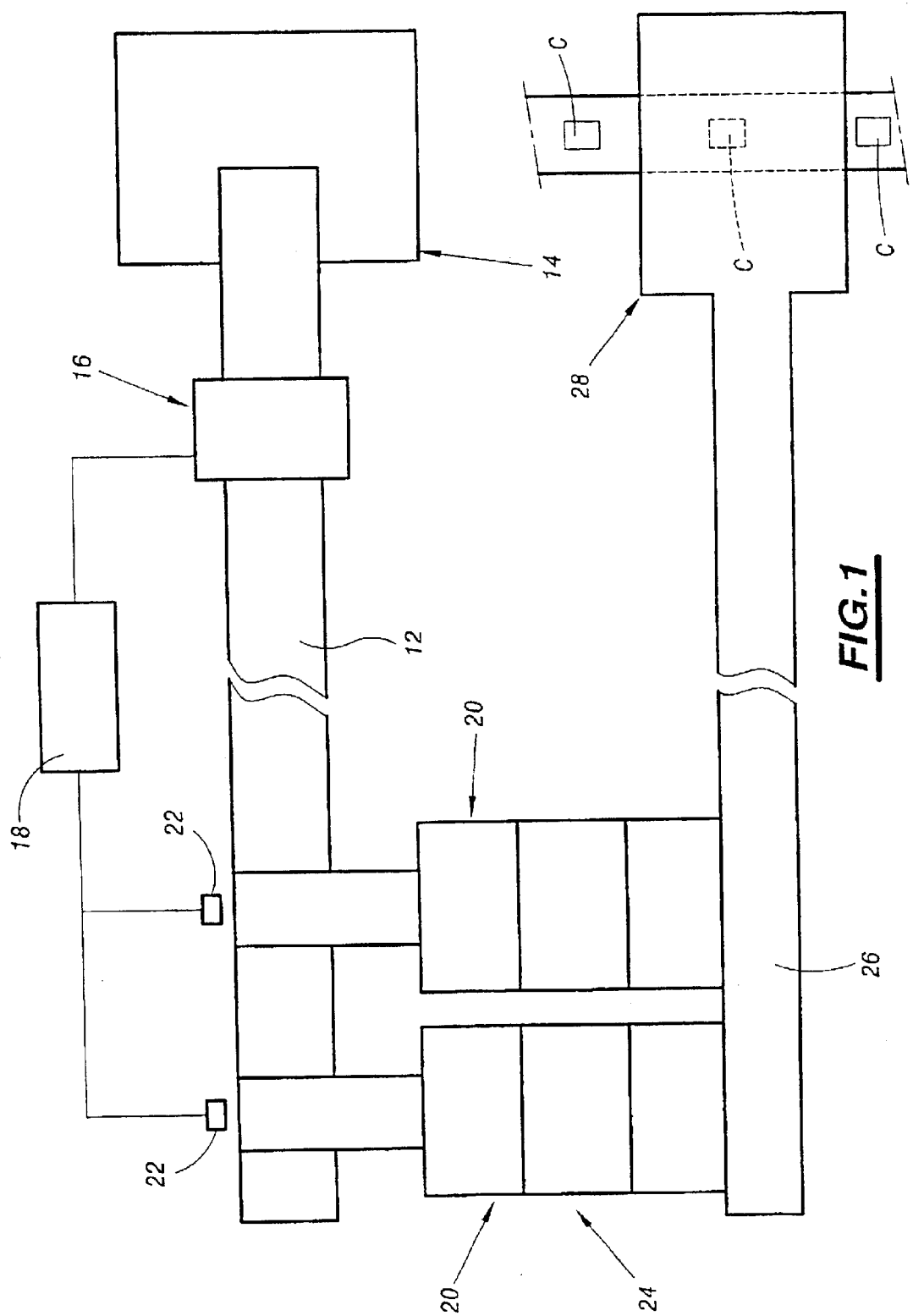
FIG. 1 is a diagrammatic plan view of a first embodiment of a grading installation including a sleeve of the invention for forced immersion of articles.

The fruit-grading installation shown in FIG. 1 comprises a fruit-transporting conveyor 12 enabling fruits to be transported individually in cells. At the inlet to the conveyor 12 there is provided a conveyor-loading station 14 enabling fruits for grading to be received in bulk and serving to put the fruits successively in respective cells.

Downstream from the loading station 14 there is a station 16 for evaluating the caliber of each fruit traveling on the conveyor. By way of example, this station includes scales or a camera for observing each fruit. The station 16 is connected to a data processor unit 18.

Downstream from the station 16, the conveyor 12 travels transversely over a set of collector basins 20 filled with water. These basins constitute zones for storing fruit temporarily as a function of their caliber.

For each basin, there is provided means 22 for ejecting a fruit traveling on the conveyor. Each ejection means enables a fruit to be dropped into the basin 20 corresponding to its caliber. The ejection means 22 are connected to the data processor unit 18 to be controlled individually thereby.

In the invention, each collector basin 20 is fitted with means 24 for temporarily storing fruits in a plurality of superposed layers. These means are described in greater detail with reference to FIGS. 2 to 5.

Each collector basin 20 is connected at a downstream end to a collector channel 26 for conveying fruit to a container-filling station 28 disposed at one end of the channel 26.

In conventional manner, the filler station 28 has means for bringing in empty containers, means for introducing the fruits brought in by the channel 26 to the inside of the containers, and means for removing filled containers.

Figure 2:
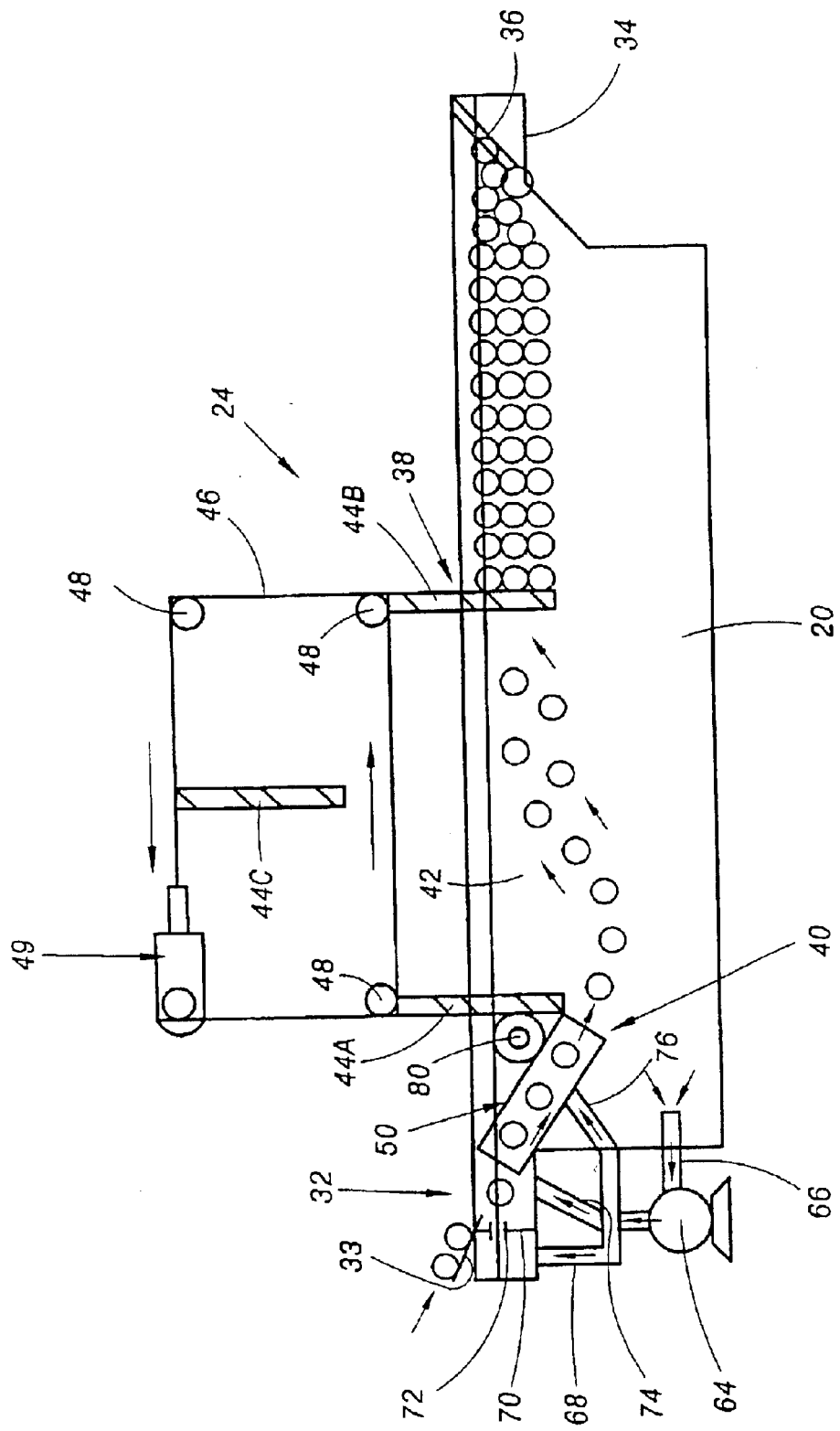
FIG. 2 is a longitudinal section view of the means for temporary storage of articles implanted in the installation of FIG. 1.
Figure 4:
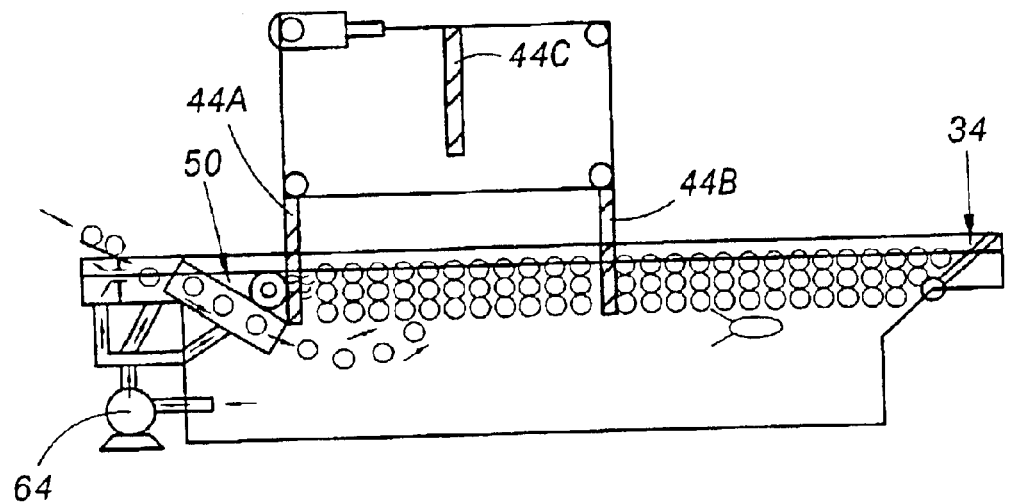
FIGS. 4 and 5 are views analogous to the view of FIG. 2, showing successive operating stages of the storage means.
Figure 5:
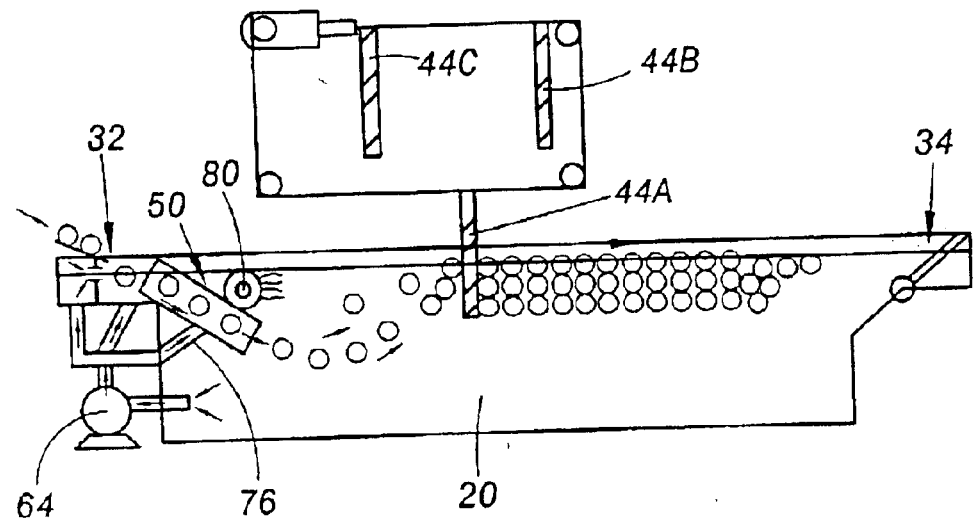

Each basin 20, one of which is shown on a larger scale in FIGS. 2, 4, and 5, may have a depth of one meter, for example, a length of three meters, and a width of one and a half meters. The basins 20 are installed side by side along the length of the conveyor 12 with their long directions extending perpendicularly to the travel direction of the conveyor.

As shown in FIG. 2, at an upstream end, each basin 20 has a shallow region constituting a zone 32 for receiving fruits coming from the conveyor 12. A fruit-guiding ramp 33 extends in part over the zone 32.

At its opposite or downstream end, the basin presents a channel 34 for connection with the collector channel 26. The channel 34 is likewise shallow. A gate 36 closes the channel 34 so as to allow the basin 20 to be isolated from the channel 26. The gate is controlled by the data processor unit 18.

The temporary storage means 24 comprise firstly a set of immersed vertical walls forming a closed outline 38 defining a space for storing fruits temporarily in a plurality of superposed layers, and secondly means 40 for forced immersion of each fruit coming from the conveyor 12 into the closed space defined by the closed outline 38.

In the embodiment shown, the closed outline 38 is defined by two parallel side walls 42 of the basin and by two moving panels 44A and 44B extending parallel to each other and transversely to the side walls 42. The panel 44A is initially placed in the downstream region of the basin while the panel 44B extends in its middle region. The panels 44A and 44B extend transversely to the length of the basin 20.

The panels 44A and 44B are carried by a loop mounted to move around four guide gears 48 under the control of drive means 49. The loop 46 is placed above the basin 20 and travels along the length of the basin. The panels 44A and 44B are associated with a third panel 44C carried by the loop. The three panels 44A, 44B, and 44C are regularly spaced apart along the length of the loop 46. They are separated by intervals of about one meter. The panels are hinged to the loop 46 and they are maintained substantially vertical under the action of their own weight. The loop 46 has a bottom strand extending over about half of the length of the basin 20, and a top return strand extending above the bottom strand.

The panels 44A and 44B as supported in this way by the loop 46 are partially immersed in the basin 20. Their bottom ends are spaced apart from the bottom of the basin so as to define a gap through which fruits can pass.

The means 40 for forced immersion of fruits comprise an inclined fruit-guiding sleeve 50 having an inlet end extending in the fruit-reception zone 32 and an opposite, outlet end directed towards the bottom of the basin and opening out beneath the level of the bottom end of the panel 44A.

Figure 3:
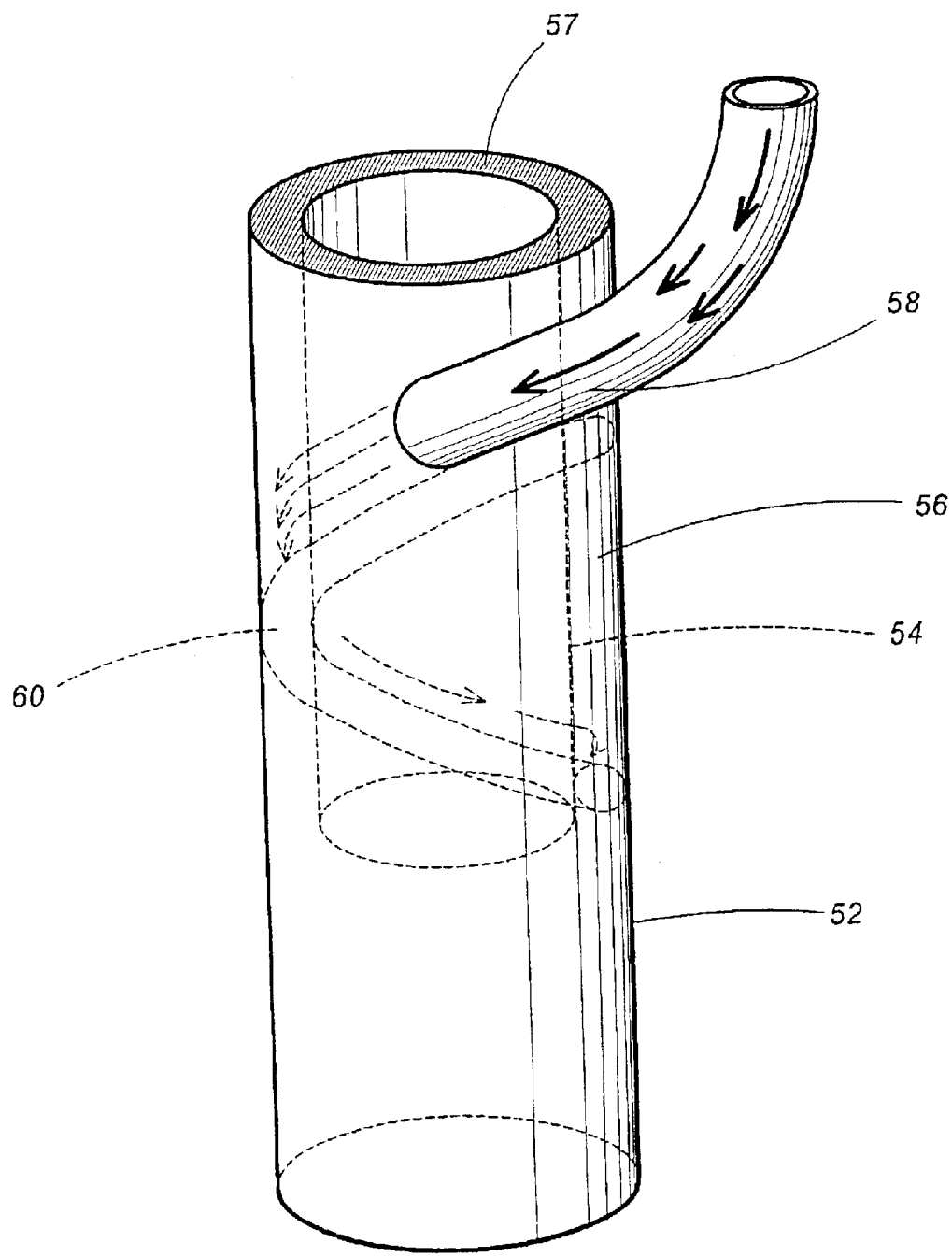
FIG. 3 is a perspective view of the sleeve for immersing articles in the temporary storage means of FIG. 2.

The fruit-immersion sleeve 50 is shown on its own in FIG. 3. It comprises a rectilinear outside tube 52 forming an envelope within which there is disposed, in its upstream portion, a skirt constituted by a tube 54 of smaller diameter. The tube 54 extends along substantially half the length of the outside tube 52. The lengths of the tubes 52 and 54 are respectively 500 millimeters (mm) and 250 mm. Their outside diameters are respectively 168 mm and 139 mm. The tubes 52 and 54 are coaxial and between them they define an annular space 56 having a width of about 12 mm.

At the inlet end of the sleeve, the annular space 56 is closed by a washer 57 welded between the ends of the tubes 52 and 54.

At least one nozzle 58 for admitting water under pressure opens out into the annular space 56 by passing through the outer tube 52. The or each nozzle is disposed in the vicinity of the inlet end of the sleeve.

When a plurality of nozzles are present, they are regularly distributed around a common circumference of the outer tube 52.

In the embodiment shown, the nozzle 58 opens out substantially tangentially to the outer tube 52 and relative to the axis of the sleeve it defines a non-zero angle, with the outlet from the nozzle being directed towards the outlet end of the sleeve. The angle defined by the nozzle 58 relative to the transverse plane of the tube advantageously lies in the range 10° to 120°, and is preferably 45°, for example. The diameter of the nozzle is about one and a quarter inches, i.e. about 3.175 centimeters (cm).

Advantageously, a helically-shaped guide wire bar is disposed in the annular space 56. It bears against both tubes 52 and 54 and serves to guide the stream of fluid coming from the nozzle 58 to follow a helical path. The bar 60 terminates at the end of the inner tube 54. The helical pitch defined by the bar 60 can be 120 mm, for example. Thus, the angle of inclination of the bar 60 relative to the axis of the tube is identical to that of the axis of the nozzle 58 at its open end.

The storage means further comprise a pump 64 whose inlet is connected to a water admission tapping point 66 installed in the vicinity of the bottom of the basin. Three water delivery ducts are connected to the outlet of the pump 64.

A first duct 68 emerges into the bottom of the fruit reception zone 32 behind a vertical wall 70 provided with a horizontal row of nozzles 72 serving to diffuse the water.

These nozzles extend substantially level with the surface of the water in the basin 20.

A second duct 74 conveys the water to the bottom of the basin in the fruit reception zone 32. It opens out between the partition 70 and the inlet to the sleeve 50.

Finally, a third duct 76 is connected to the nozzle 58 of the sleeve for forced immersion of the fruits. The pump is such that the flow rate through the nozzle 58 lies in the range 20 $m^3/h$ to 100 $m^3/h$, and preferably in the range 20 $m^3/h$ to 40 $m^3/h$.

An immersed pump 80 is also placed above the sleeve 50. It sets up a flow of water in the basin 20 flowing round a closed circuit going from upstream to downstream on the surface, i.e. from the zone 32 to the connection channel 34.

The installation shown in FIGS. 1 to 5 operates as follows.

Fruits received in bulk in the station 14 are placed individually in cells. The caliber of each fruit is evaluated in the unit 16. As a function of the caliber allocated thereto, each fruit is ejected over one of the reception zones 32 of a water-filled basin that corresponds to said caliber. The fruit is then guided to the reception region 32 by the ramp 33.

Initially, the loop 46 of the temporary storage means is placed in a position such that two panels 44A and 44B are partially immersed and co-operate with the side walls 42 of the basin to define a closed space for receiving fruits.

Under the action of the water circulation set up by the pump 64, the fruits are guided to the sleeve 50.

The water under pressure delivered to the sleeve 50 from the nozzle 58 enters the annular space 56 with a non-zero angle of incidence relative to the transverse plane. In addition, its path curves on coming into contact with the cylindrical wall of the outer tube 52. Thus, a helical stream is created inside the sleeve 50 along its outside wall. This stream is directed towards the fruit outlet end.

Fruits are sucked into the sleeve 50 by the Venturi effect under the action of the helical stream established at the periphery of the outer tube. The fruits are then conveyed through the sleeve to the bottom end thereof from which the fruits are released into the water of the basin at a depth that is deeper than the bottom end of the panel 44A.

The ejection of fruits from the sleeve 50 and the entry of fruits into the mass of water in the basin 20 are facilitated by the helical stream formed at the outlet from the sleeve, this stream sets up a corkscrew effect that prevents the fruits from coming into abutment against the mass of water. The helical stream set up in the sleeve 50 enables the flow rate of driving water stream needed to immerse one fruit to be relatively small, thereby limiting the capacity needed from the pump 64.

After being expelled from the sleeve 50, the fruits rise towards the surface since the density of the fruits is less than that of water. Since the fruits are released beneath the closed outline 38, they are confined within the closed space defined by said outline.

As more and more fruits arrive, as shown in FIG. 4, the fruits accumulate inside the closed outline 38 and occupy a plurality of layers. The fruits are simultaneously entrained towards the downstream panel 44B under drive from the stream set up by the immersed pump 80 placed behind the upstream panel 44A.

As soon as the number of fruits introduced between the panels 44A and 44B corresponds to the number of fruits that can be contained in a container, the loop 46 is set into motion as shown in FIG. 5, causing the downstream panel 44B to be retracted, being lifted towards the return path, while the upstream panel 44A pushes the fruits towards the outlet panel 34. Simultaneously, the panel 44A constitutes a barrier for retaining any fruits that continue to be delivered by the forced immersion means 40. The panel 44A is brought into the position previously occupied by the panel 44B, with the initial position of the panel 44A now being occupied by the third panel 44C which was initially on the return path of the loop. The newly-positioned panels thus define a new closed space for receiving fruits. The above-described cycle is started over.

The fruits released by the temporary storage means are then taken by the channel 26 to the container-filling station 28.

It will be understood that the installation descried above makes it possible for each caliber of fruit to have a temporary storage zone for calibrated fruits while considerably reducing the total area occupied by the installation. Each temporary storage means occupies a small amount of floor space because the fruits are stored in a plurality of layers.

Figure 6:
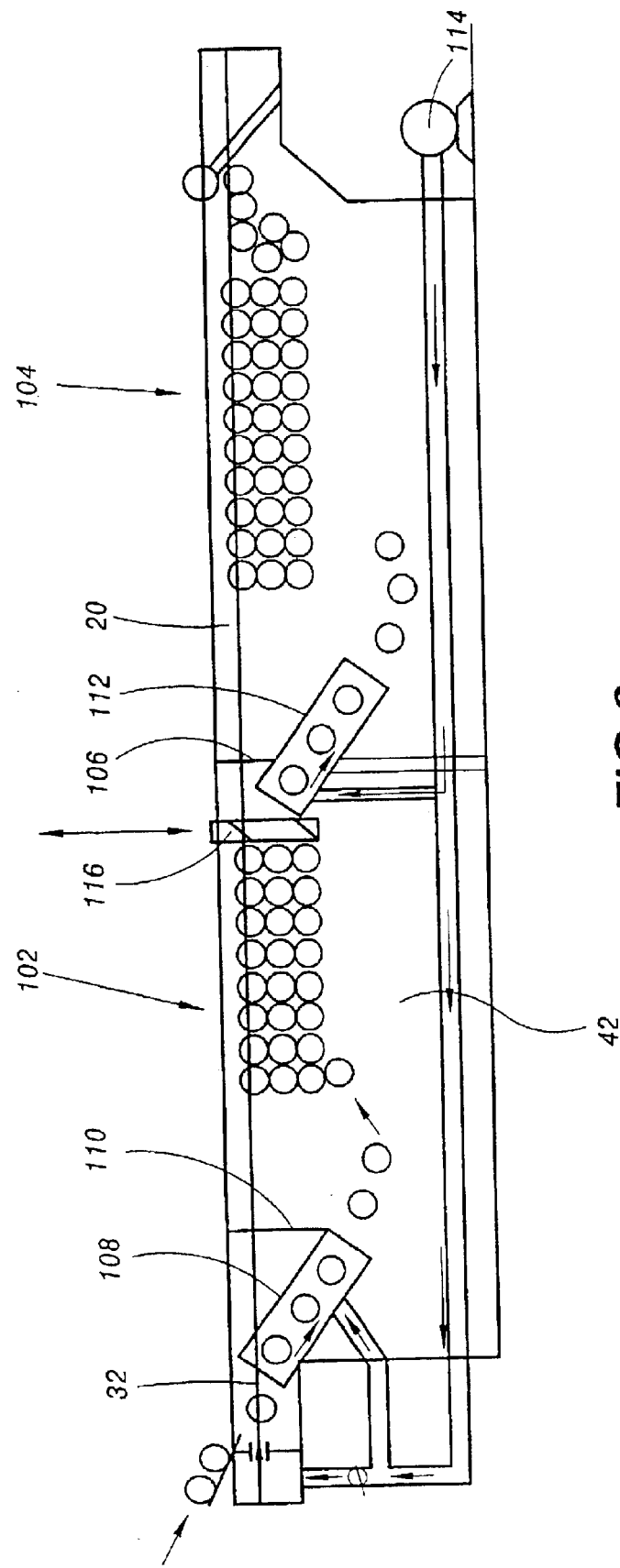
FIG. 6 is a longitudinal section view of a variant embodiment of the temporary article-storage means suitable for including in the installation of FIG. 1.

FIG. 6 shows a variant embodiment of the temporary storage means suitable for use in the installation of FIG. 1.

In this variant embodiment, the vessel 20 is split into two temporary accumulation regions 102 and 104 of substantially identical volumes, by means of a perforated transverse wall 106. The first region 102 is situated immediately downstream from the fruit reception zone 32. A forced immersion sleeve 108 whose inlet end is disposed in the fruit reception zone 32 connects the zone 32 to the accumulation region 102. The outlet end of the sleeve points towards the bottom of the vessel 20 and extends to a depth that enables fruit to accumulate in a plurality of layers. A vertical partition 110 is provided over the outlet end of the sleeve 108.

A second sleeve 112 for forced immersion of fruits is provided through the intermediate partition 106. The inlet end of this sleeve is placed in the vicinity of the surface of the water contained in the accumulation region 102. Its outlet end is placed in the region 104. It points towards the bottom of the vessel and is spaced apart from the level of the liquid.

The two sleeves 108 and 112 for forced immersion of fruit are identical to the sleeve 50 of FIG. 3. They are fed by a pump 114 taking water from the basin 20 and reinjecting it through the sleeves, and also through nozzles provided in the fruit reception zone 32.

Finally, a removable panel 116 is mounted facing the inlet end of the second sleeve 112. By way of example, the panel 116 can be slid in a vertical direction between a position in which it closes off the inlet to the sleeve 112, and a position in which it is retracted above the level of the water so that the fruits are freed to engage in the sleeve 112. The panel 116 thus forms a guillotine.

In this embodiment, the panel 116 is initially in its position for closing off the inlet to the sleeve 112.

The fruits arriving from the conveyor and dropping into the reception zone 32 are immersed by the sleeve 112 and are released at depth in the first accumulation region 102 beneath the closed space defined by the side walls of the basin 20 and the walls 110 and 116.

As fruits are ejected from the sleeve 108 they accumulate in a plurality of layers between the walls 110 and 116. Once a quantity of fruits sufficient for filling a container has accumulated in the region 102, the panel 116 is raised so that the fruits present in this temporary accumulation region are sucked progressively through the second sleeve 112 and transferred into the accumulation region 114 where they likewise take up positions in a plurality of superposed layers.

For loading into a container, the fruits contained in the accumulation region 104 are subsequently transferred by the collector channel 26 and they are taken to the loading station 28.

With such temporary storage means, the total area of the installation is likewise small since the fruits are stored in a plurality of thicknesses.

Figure 7:
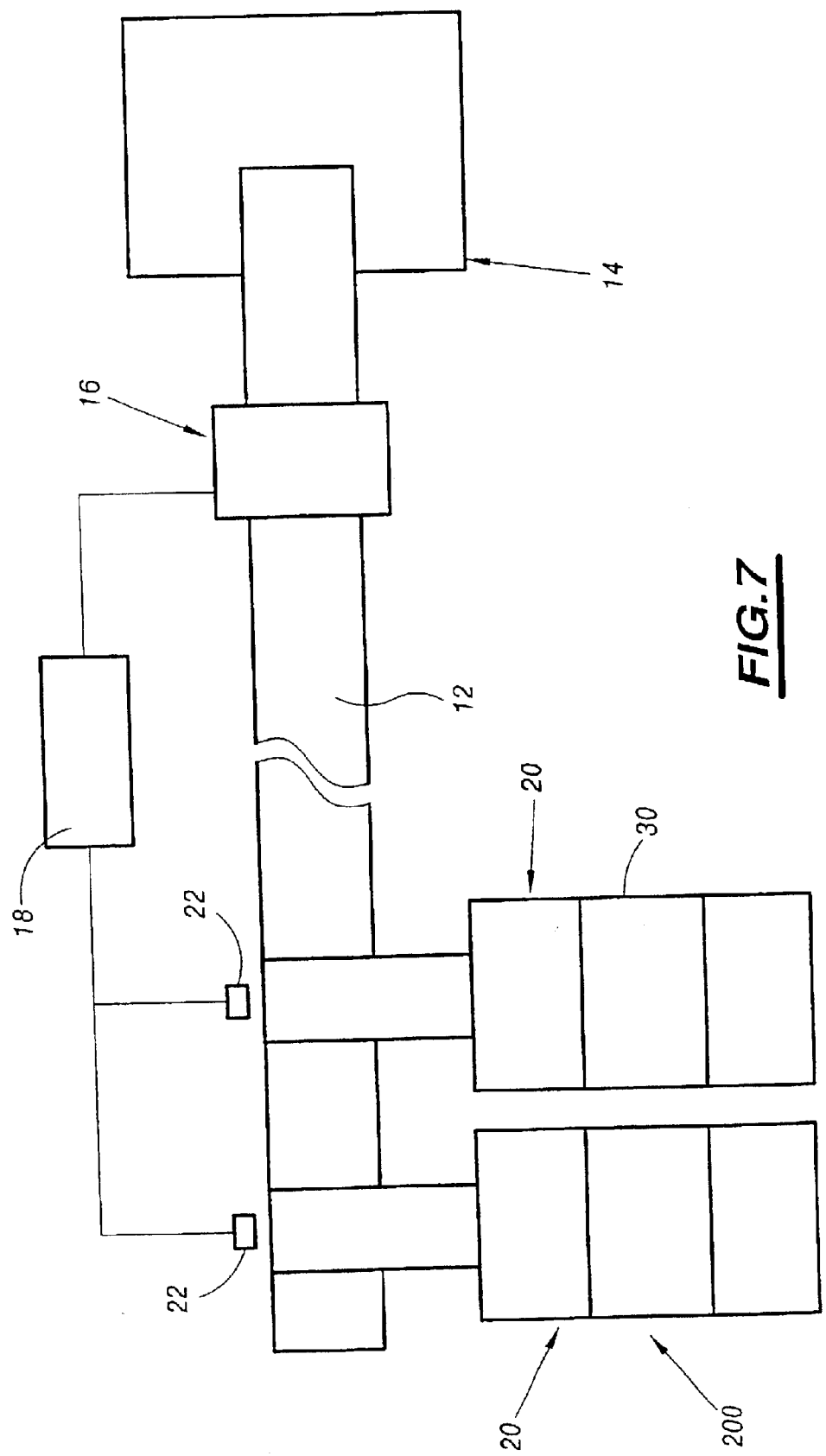
FIG. 7 is a diagrammatic plan view of a second embodiment of a grading installation.

FIG. 7 shows a variant embodiment of the installation of the invention.

In this embodiment, elements that are identical or analogous to those of the embodiments in the preceding figures are designated by the same reference numerals.

As shown in FIG. 7, the variant embodiment of the installation does not have a collector channel 26 for transferring fruits, nor does it have a common unit for loading fruits into containers.

Figure 8:
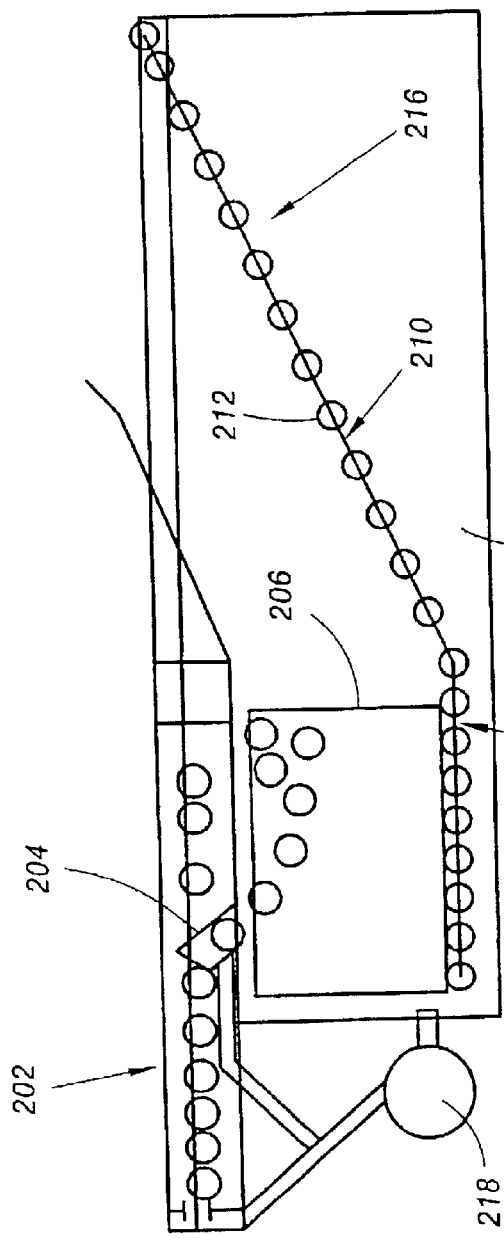
FIGS. 8 and 9 are respectively a longitudinal section view and a plan view of means for temporarily storing articles as used in the installation of FIG. 7.
Figure 9:
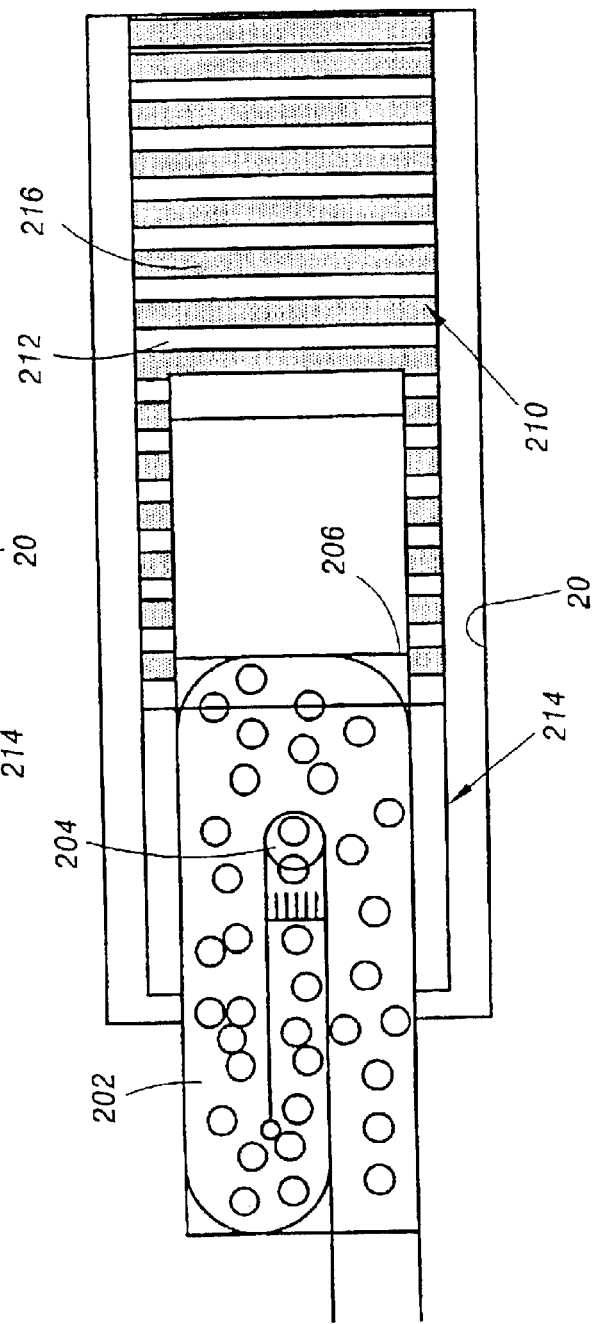

Nevertheless, for each caliber of fruit, it does comprise a basin 20 having means 200 for temporarily storing fruits in a plurality of superposed layers. As shown in FIGS. 8 and 9, these means comprise means for directly loading fruits in a plurality of layers into the inside of an immersed container.

For this purpose, the means 200 comprise a spiral-shaped horizontal channel 202 having the fruits coming from the conveyor 12 received in one end thereof and having a forced immersion sleeve 204 identical to the sleeve 50 of FIG. 3 installed at its other end.

A container 206 is immersed beneath the sleeve 204 in the basin 20. Such a container has an open top face.

In the vessel 20, there is placed a path 210 on which the container 206 can run and be supported. This path comprises a succession of rollers extending parallel to one another. The path 210 presents a plane region 214 for supporting the container beneath the sleeve 204 and a ramp-forming inclined region enabling an empty container to be immersed and enabling a full container to be extracted from the basin. The position of the path 210 is defined in such a manner that the open face of the container lies immediately beneath the bottom of the channel 202.

A pump 218 having a suction inlet drawing from the basin 20 has its delivery outlet connected firstly to the end of the spiral-shaped channel 202 in which the fruits are received, and secondly to the sleeve 204 in order to feed it with water.

In this embodiment, the closed outline defining the fruit-reception space is defined by the four side walls of the container 206.

It will be understood that in this embodiment, as in the preceding embodiment, the fruits from the conveyor 12 all having the same caliber are taken to the sleeve 204 by the channel 202. The fruits are then immersed and released at the bottom of the case 206 by the sleeve 204. On rising, the fruits accumulate inside the case 206, occupying a plurality of superposed layers. The bottom of the channel 202 thus forms a barrier preventing the fruits from escaping from the container 206.

When a container is full, it is extracted from the basin and replaced by an empty container.

In this embodiment likewise, temporarily storing caliber-graded fruits in a plurality of superposed layers makes it possible to reduce considerably the area occupied by each of the basins, and thus the total area occupied by the installation.

Figure 10:
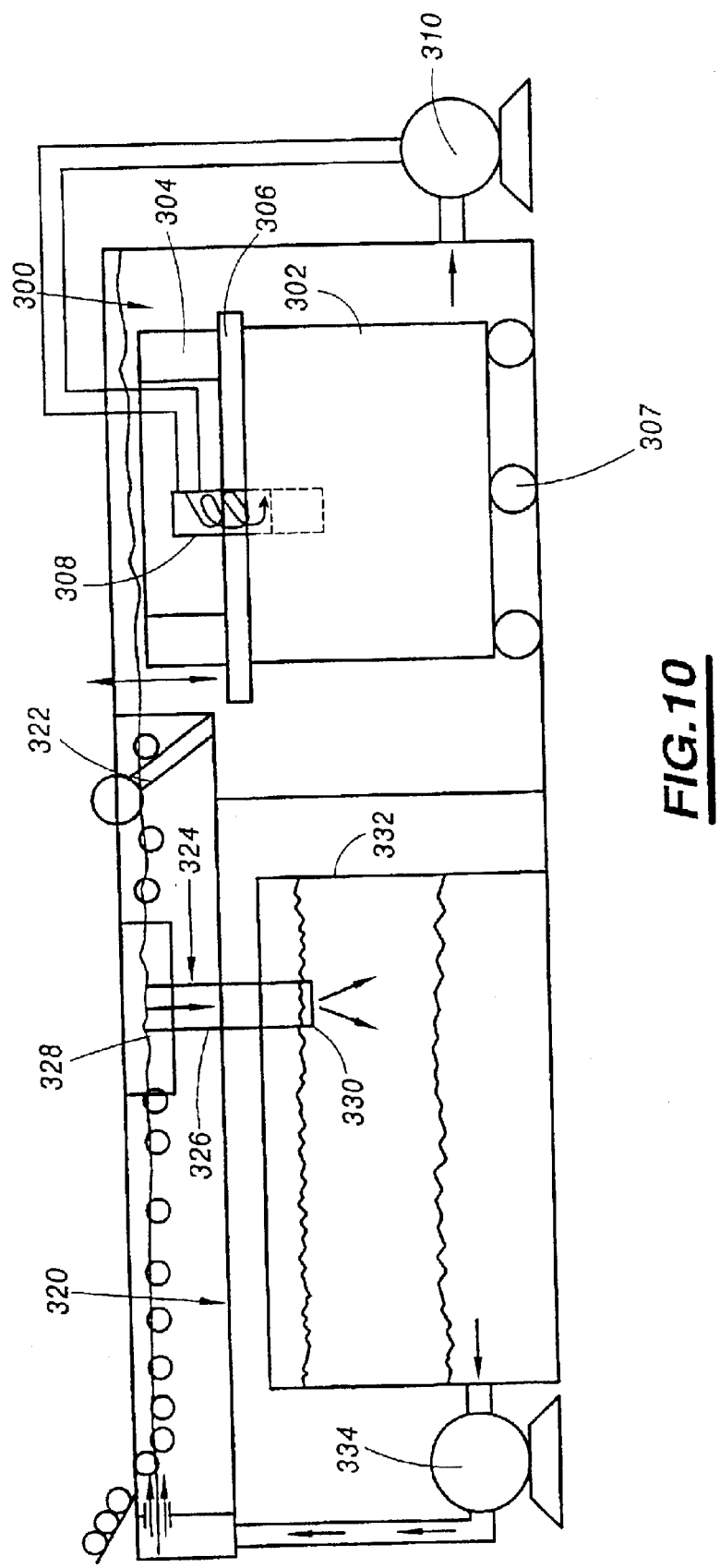
FIG. 10 is a longitudinal section view of a variant embodiment of the means for temporarily storing articles and suitable for being included in the installation of FIG. 7.

FIG. 10 shows a variant embodiment of the temporary storage means suitable for being installed at each conveyor outlet 12 in the FIG. 7 installation.

In this embodiment, a water-filled basin 300 is adapted to receive a container 302 for transporting graded fruits. The main portion of the basin is of sufficient depth to enable the container 302 to be fully immersed.

Moving equipment 304 is mounted so as to be displaceable relative to the basin between a container-filling position shown in FIG. 10 in which it is immersed, and a retracted position in which the container is retracted to above the level of the basin 300. This moving equipment is vertically displaceable. It comprises means 307 for supporting a container and a horizontal plate 306 suitable for forming a cover for closing off the container 302 whose top end is normally open. This cover 306 has a sleeve 308 passing therethrough for forced immersion of fruits inside the container 302. This sleeve is identical to the sleeve shown in FIG. 3. The sleeve 308 is fed from a pump 310 whose inlet takes water from the vessel 300.

The vessel 300 presents a region of smaller thickness 320 for receiving fruits from the conveyor 12. The region 320 has a moving shutter partition 322 placed at its end that opens out into the main portion of the vessel that is suitable for receiving a container 302.

In addition, an overflow 324 formed by a generally vertical tube 326 passes through the vessel 300. A top end 328 defines the height of the liquid surface contained in the vessel 300. The bottom end 330 of the tube opens out into a buffer vessel 332 disposed beneath the region 320 of the vessel. The bottom of the buffer vessel 332 is connected to a pump 334 whose outlet is connected to one end of the region 320 of the vessel.

In this embodiment, fruits are conveyed from the transporter 12 to the calibrated fruit-reception region 320. When the equipment 304 is in its filling position, the fruits are taken to the inlet end of the forced immersion sleeve 308. The sleeve takes the fruits to the bottom of the container 302. Under the effect of buoyancy, the fruits rise and accumulate in a plurality of layers inside the container 302, being held by the cover-forming plate 306. Once the container is full, it is extracted from the basin 300 together with the moving equipment 304, such that during movement of the container, the plate 306 is maintained on the open end of the container so as to prevent any fruit from escaping.

In addition, it will be understood that as the fruits arrive progressively in the reception region 320 and accumulate in the container 302, the water level in the vessel 300 tends to rise. Thus, the water flows out through the overflow 324 and accumulates in the buffer tank 332 so as to ensure there is no risk of the vessel 300 overflowing.

After a full container 302 has been extracted, the water level in the vessel 300 is reestablished by the pump 334 which returns the water temporarily stored in the buffer tank 332 back to the basin 300.

What is claimed is:

1. Conveyance equipment adapted for forced immersion of an article, the equipment comprising a sleeve adapted for forced immersion of an article, which sleeve for forced immersion of an article comprises a body defining a passage along which an article can travel and at least one liquid inlet, through which liquid flows, for establishing an article drive stream, the equipment further comprising a pump having its outlet connected to the at least one liquid inlet of the sleeve, the equipment being characterized in that said passage defined by the body is generally tubular and in that the sleeve has means for establishing, in said passage, a helical stream of liquid flowing at the periphery of said passage.

2. The conveyance equipment according to claim 1, wherein said means for establishing the helical stream of liquid comprise at least one injection nozzle forming the liquid inlet and opening out substantially tangentially to the inside of the tubular body, the axis of the injection nozzle at its open end being angularly offset relative to the transverse plane of said passage taken at the open end of the injection nozzle.

3. The conveyance equipment according to claim 2, wherein said sleeve has at least two nozzles regularly distributed around a circumference of said passage.

4. The conveyance equipment according to claim 2, wherein said sleeve has a generally tubular outer envelope defining part of said passage, the at least one injection nozzle opening out through said envelope, and said means for establishing the helical liquid stream comprise a tubular skirt disposed inside the envelope facing the region into which the at least one injection nozzle opens out, said skirt extends over a fraction only of the length of the envelope and defines an article guide duct therein, said skirt co-operating with the envelope to define an annular space in which the helical liquid stream travels, which annular space opens out into said passage at one end.

5. The conveyance equipment according to claim 4, wherein the sleeve includes a helical guide disposed in said annular space between the outer envelope and the skirt.

6. The conveyance equipment according to claim 1, wherein the pump has a delivery rate in the range of 20 m³/h to 100 m³/h.

7. The conveyance equipment according to claim 3, wherein said sleeve has a generally tubular outer envelope defining part of said passage, the at least one injection nozzle opening out through said envelope, and said means for establishing the helical liquid stream comprise a tubular skirt disposed inside the envelope facing the region into which the at least one injection nozzle opens out, said skirt extends over a fraction only of the length of the envelope and defines an article guide duct therein, said skirt co-operating with the envelope to define an annular space in which the helical liquid stream travels, which annular space opens out into said passage at one end.

8. The conveyance equipment according to claim 2, wherein the pump has a delivery rate in the range of 20 m³/h to 100 m³/h.

9. The conveyance equipment according to claim 3, wherein the pump has a delivery rate in the range of 20 m³/h to 100 m³/h.

10. The conveyance equipment according to claim 4, wherein the pump has a delivery rate in the range of 20 m³/h to 100 m³/h.

11. The conveyance equipment according to claim 1, wherein the pump has a delivery rate in the range of 20 m³/h to 100 m³/h.

* * * * *